H. & E. L. Bailey,
Urn Cock,
N° 57,246.  Patented Aug. 14, 1866.
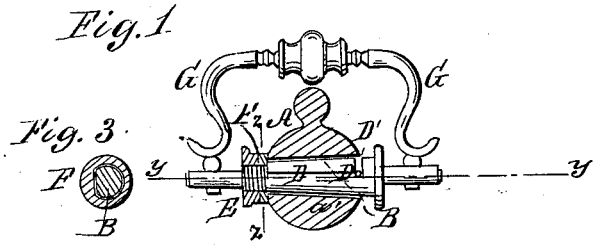
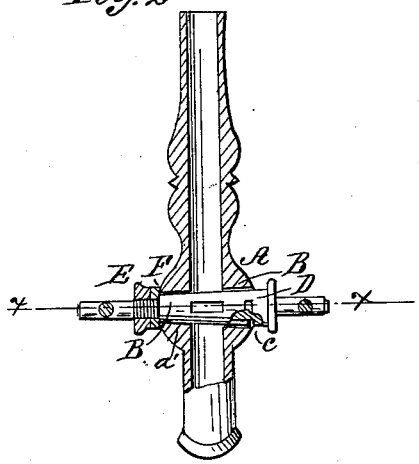
Witnesses;
Jas. A. Service
W. B. Covington
Inventors;
H. Bailey
E. L. Bailey
Per Munn & Co.
Attorneys

UNITED STATES PATENT OFFICE.

HENRY BAILEY, OF BROOKLYN, NEW YORK, AND EDWIN L. BAILEY, OF PHILADELPHIA, ASSIGNORS TO HENRY BAILEY, OF PHILADELPHIA, PENNSYLVANIA.

IMPROVEMENT IN DROP-HANDLE URN-COCKS.

Specification forming part of Letters Patent No. 57,246, dated August 14, 1866.

*To all whom it may concern:*

Be it known that we, HENRY BAILEY, of Brooklyn, Kings county, State of New York, and EDWIN L. BAILEY, of Philadelphia, Philadelphia county, and State of Pennsylvania, have invented a new and useful Improvement in Drop-Handle Urn-Cocks; and we do hereby declare that the following is a full, clear, and exact description thereof, which will enable others skilled in the art to make and use the same, reference being had to the accompanying drawings, forming part of this specification, in which—

Figure 1 is a vertical cross-section of our improved urn-cock taken through the line $x\,x$, Fig. 2. Fig. 2 is a horizontal section of the same taken through the line $y\,y$, Fig. 1. Fig. 3 is a detail sectional view taken through the line $z\,z$, Fig. 1.

Similar letters of reference indicate like parts.

Our invention has for its object to furnish an improved drop-handle urn-cock, stronger, more durable, less liable to get out of order, and less liable to leak than the urn-cocks now in use; and it consists, first, in the combination of a pin and groove with the plug and with the barrel of the cock, for the purpose of stopping the revolution of the plug at the points where the cock is fully open and fully closed; second, in the combination of a nut and washer with the plug and with the body of the cock, for the purpose of holding the plug securely in place.

A is the body or barrel of the cock, which is made in the ordinary manner. Horizontally through the enlarged part $a'$ of the body A of the cock is formed a tapering hole for the passage of the plug B in the ordinary manner. This hole is made tapering, so that the plug B, as it or the hole wears, may be pushed farther in, and thus kept always tight.

Through one side of the enlarged part $a'$ of the body A of the cock is formed a small hole, in which is firmly secured a pin, C, projecting into the tapering hole into which the plug B fits. The plug B is made tapering, and has a slot, D, formed longitudinally along one of its sides, as shown in Fig. 1. When this slot reaches the pin C it turns at right angles (shown at D') to its former course and passes one-quarter of the distance around the said plug, so that the pin C may prevent the said plug from being turned more than one-quarter round.

The part of the slot D which passes partly around the plug B is made wider than the pin C, so that when the plug or hole has become worn and the plug been pushed farther in, the pin C may still work in the slot D.

Upon the smaller end of the plug B is cut a screw-thread, as shown in Figs. 1 and 2. Upon this screw-thread is screwed a nut, E, to hold the plug securely in place.

To prevent the backward and forward movement of the plug B from working the nut E off, a washer, F, is placed upon the plug between the nut E and the enlarged part $a'$ of the body A of the cock, as shown in Figs. 1 and 2. This washer may be made to turn with the plug B by slightly flattening one side of the plug and making the hole through the washer of such a form as to fit upon the said plug.

The larger end of the plug B is turned down, leaving the part nearest to the body of the cock of the same size and form as the nut E, so that the appearance of the cock may be symmetrical.

Through the ends of the plug B are formed holes, into which fit the lower ends of the arms of the handle G, upon which are cut screw-threads. The lower parts of these holes are enlarged, so as to receive the upper ends of the nuts which secure the said handle in its place.

We claim as new and desire to secure by Letters Patent—

The plug B, having a right angular groove, D D', operating with the fixed pin C, or its equivalent, on the face of the tapering hole of the body A, provided with nut E and washer F, substantially as described, for the purpose specified.

HENRY BAILEY.
EDWIN L. BAILEY.

Witnesses to signature of Henry Bailey:
JAMES T. GRAHAM,
ALEX. F. ROBERTS.

Witnesses to signature of Edwin L. Bailey:
JOHN FRY,
RICH. McCAMBRIDGE.